March 24, 1936.      A. M. KING      2,034,761
LIFTING DEVICE FOR AIRCRAFT
Filed June 26, 1933      2 Sheets-Sheet 1

Inventor
Archibald M. King
By: Zabel Banning & Wells
Attys.

March 24, 1936.  A. M. KING  2,034,761
LIFTING DEVICE FOR AIRCRAFT
Filed June 26, 1933   2 Sheets-Sheet 2
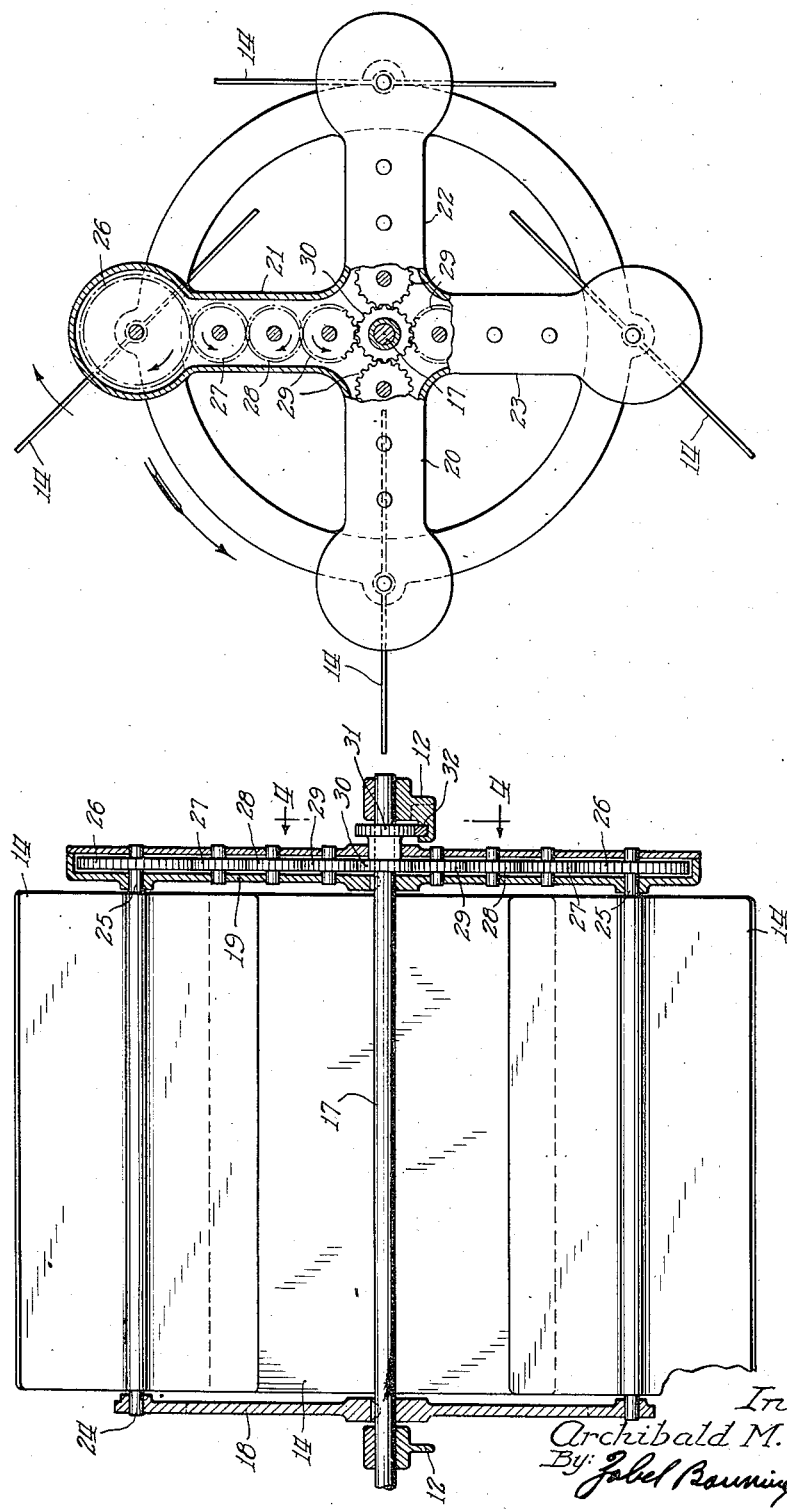

Patented Mar. 24, 1936

2,034,761

UNITED STATES PATENT OFFICE 2,034,761

LIFTING DEVICE FOR AIRCRAFT

Archibald M. King, Chicago, Ill.

Application June 26, 1933, Serial No. 677,543

1 Claim. (Cl. 244—16)

My invention relates to lifting devices for aircraft and the like which are adapted for applying a lifting force in direct opposition to the force of gravity.

It is the principal purpose of this invention to provide a device of this character in which a plurality of vanes or fan blades are so operated as to exert throughout the greater portion of their orbit of rotation a downward pressure upon the air to thus create a lifting force tending to elevate the lifting device and the aircraft to which it is secured.

It is a further object of my invention to provide a device of this character in which a drive shaft rotates the vanes and through certain control connections also causes the vanes to change their relative position throughout their rotation so as to pass edgewise through the air at one point on the upstroke and to move horizontally downward in the opposite position gradually changing between these two points.

It is a further purpose of my invention to provide a device of this character in which a plurality of vanes rotating about a common axis are caused to pass through the air edgewise at one point in their orbit and to move flat against the air at the opposite point of their orbit with means whereby the position of the points may be changed angularly about the axis of rotation while the vanes are rotating.

Other and more specific objects and advantages of the invention will appear as the description proceeds in connection with the accompanying drawings wherein one form of the invention is shown. It is to be understood, however, that the drawings and description are illustrative only and that various modifications may be made from the details shown and described without departing from the scope of the invention as defined by the claim.

In the drawings—

Fig. 2 is an enlarged section taken on the line 2—2 of Fig. 1;

Fig. 3 is an end view partly in section of a lifting device; and

Figure 1:
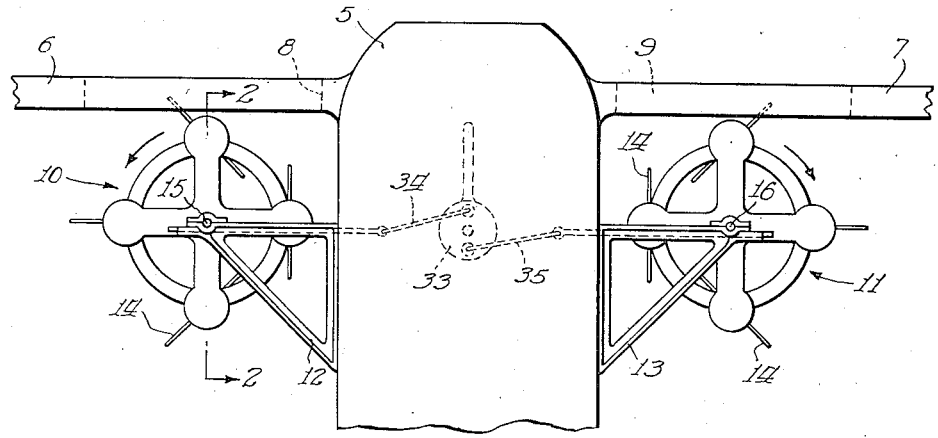
Fig. 1 is a view looking endwise at an aeroplane with the propeller and engine mounting as well as the landing wheels left off to illustrate more clearly the position of the lifting devices.

Referring now in detail to the drawings, the aircraft is indicated by the numeral 5 and may be provided with the usual propeller, landing wheels, etc. Sections 6 and 7 of the wing structure are shown, and the structures are preferably cut away as indicated at 8 and 9 to provide open spaces above the lifting devices 10 and 11. These lifting devices 10 and 11 are preferably mounted as by suitable brackets 12 and 13 on opposite sides of the fuselage and are driven by power device, not shown, mounted within the fuselage 5. The lifting devices have lifting vanes 14 thereon which vanes are caused to rotate about the axis 15 and 16 of the lifting devices in opposite directions as indicated by the arrows in Fig. 1 so that the lifting moments of one lifting device are balanced against that of another lifting device.

I will now describe the manner in which the lifting vanes are operated to obtain a maximum lift effect for power exerted.

Referring to Figs. 2 and 3, it will be noted that there are a series of vanes mounted about the central drive shaft 17. The principle of the invention is the same for one vane 14 as for all of them. However, with several vanes a more smooth lifting effect is obtained, and I have shown four of these vanes as making up one lifting device. On the shaft 17, there is keyed a pair of skeleton frameworks 18 and 19 so that rotation of shaft 17 causes corresponding rotation of the two frameworks. These frameworks have the radially extending arms such as 20, 21, 22, and 23 which provide supports for the vanes 14. Each vane is pivoted as indicated at 24 and 25 so that it is capable of turning about its own axis parallel to the shaft 17.

I might state at this point that, while I have shown the vanes as elongated flat plates or blades, they may be of any suitable shape best fitted for accomplishing their lifting purpose. Naturally, they should be constructed of a light weight material having a high tensile strength.

Each vane shaft carries a drive unit or gear 26 which is connected as shown by a series of gears 27, 28, and 29 to a common control gear 30 which is rotatably mounted on the shaft 17 but is directly connected to the control gear 31 that meshes with the rack at 32. Gears 26 are made twice the size of gear 30, that is, with twice the number of teeth so that one rotation of gear 30 causes only a half rotation of gear 26. The function of this gear control mechanism is to keep all of the vanes 14 in a fixed relation and also to change the position of the vanes as they are rotated by shaft 17 without affecting their relationship.

A brief examination of Fig. 3 will, it is believed, aid in understanding how the control gears operate. In this case, we assume the shaft 17 is rotating in the direction of the arrow. As the spider or framework 19 rotates with the shaft, it causes a rotation of gear 29 in the direction shown by the arrow in Fig. 3 due to the fact that gear 30 is held stationary by gear 31 and rack 32. Gears 28 and 29 are caused to rotate in this fashion, and gear 26 is thus rotated in the direction indicated by the arrow in Fig. 3 so as to turn its vane 14 in a clockwise direction as the shaft 17 rotates in a counterclockwise direction. The rate of turning, however, is only half the rate of rotation of shaft 17, so that, for a rotation of 180 degrees by shaft 17, the vanes 14 rotate only 90 degrees. Thus it is clear that, while the vane 14 is vertical and going into the air edgewise at the right hand side of Fig. 3, it will be horizontal and moving flat against the air on its down stroke at the left hand side of Fig. 3. An inspection of Fig. 3 illustrates clearly that throughout most of the travel of the vane 14 it is exerting a downward pressure on the air, and, only when it is in the position of rising as at the right hand side of Fig. 3, does it require any force for lifting it. At this point, the vane is in the edgewise position and can be carried upward with no more effort than lifting that amount of weight.

Figure 4:
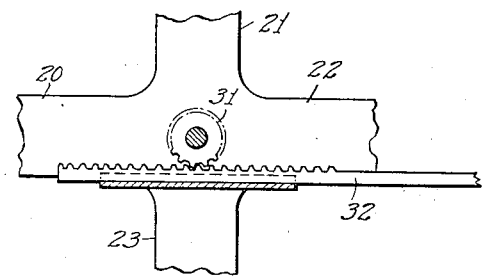
Fig. 4 is a view taken substantially on the line 4—4 of Fig. 2.

Referring now again to Figs. 1 and 4, the rack 32 is shown as connected to a suitable control device 33 by means of the links 34 and 35. This rack 32 is used as a means to adjust the angular position of the vanes at the will of the operator so as to change the position at which the vanes are edgewise to take care of the effect of side winds or other conditions which would effect the lifting power of the vanes. Movement of the rack 32 in either direction can be accomplished without in any way interfering with the operation of the lifting device so that the adjustment can be made at any time. I have shown the two adjusting mechanisms for the lifting devices in Fig. 1 as operated from a single control although it is obvious that they may be operated separately if desired.

Having thus described my invention, what I claim as new and desire to secure by Letters Patent is:

In an aeroplane, a pair of rotating lifting devices each having its axis running lengthwise of the aeroplane said devices being located on opposite sides of the longitudinal center line of the aeroplane, each of said devices comprising a plurality of vanes, means mounting said vanes for rotation about the axis of the device, and control means for moving said vanes between a vertical plane and a horizontal plane for each rotation thereof about the axis, said control means including a central stationary gear member a radially extending train of gears connecting said gear member to each vane and a common control lever connected to the stationary gears of the two lifting devices for adjusting the position of the stationary gears.

ARCHIBALD M. KING.